Feb. 6, 1962    J. H. MacNEILL    3,019,970
HOT WIRE READER
Filed Dec. 16, 1958    2 Sheets-Sheet 1
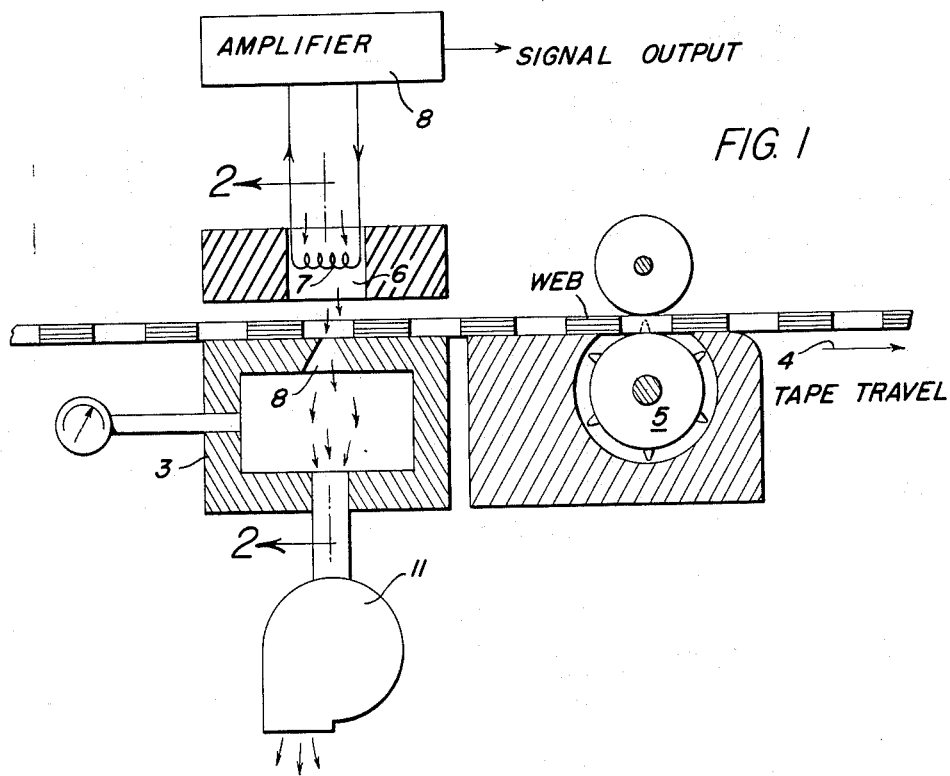
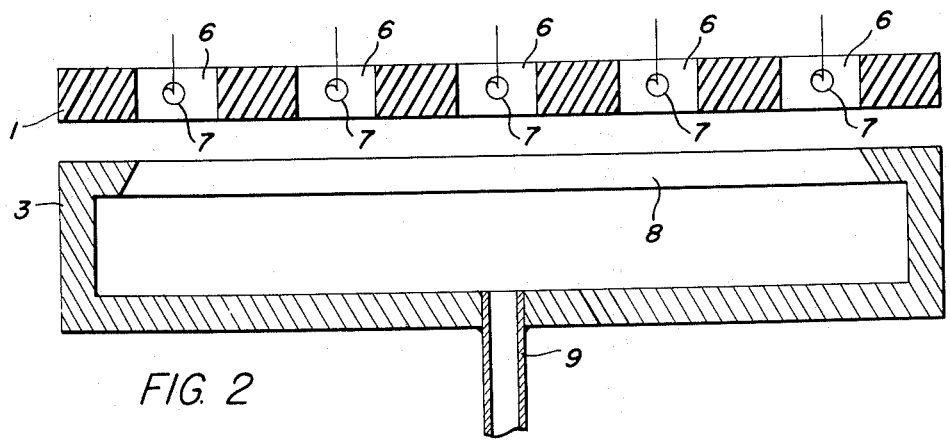
INVENTOR
JOHN H. MacNEILL
BY Hurvitz + Rose
ATTORNEYS Feb. 6, 1962  J. H. MacNEILL  3,019,970
HOT WIRE READER Filed Dec. 16, 1958  2 Sheets-Sheet 2

INVENTOR
JOHN H. MACNEILL

BY Hurvitz & Rose

ATTORNEYS

# 3,019,970
Patented Feb. 6, 1962

3,019,970
HOT WIRE READER
John H. MacNeill, Melbourne, Fla., assignor to Soroban, Inc., Melbourne, Fla., a corporation of Florida
Filed Dec. 16, 1958, Ser. No. 780,697
20 Claims. (Cl. 235—61.11)

The present invention relates to perforated member sensing mechanisms and more particularly to a high speed perforated member sensing mechanism which is unaffected by dirt and flying bits of paper and which produces signals having high signal-to-noise ratios.

At present there are available three general types of perforated member sensing mechanisms; those utilizing brushes which reset on top of a perforated member and pass through perforations therein to engage contacts disposed on an opposite side of the perforated members from the brushes; those employing sensing pins which are normally spaced from the perforated member and are moved towards it during a sensing operation so that those pins which are aligned with perforations pass through the member, and photo-electric readers in which a beam or beams of light directed toward a photocell or photocells are interrupted at all times except when perforations are disposed in the optical path between the source of light and the light sensing member or members. The two former mechanisms are relatively slow since mechanical inertia of the sensing members limit the rate at which individual perforations may be sensed. The latter method, that is the photo-electric method is materially more rapid than the two former methods but suffers from difficulties arising from the presence of dirt and paper chaff in the region of the photocells. More particularly, dust and bits of paper from the perforated member accumulate around the photocells and limit the amount of light that reaches the photo-sensitive element. Unless the photocells are regularly cleaned the amplitude of signals produced thereby fall into the region of the threshold of response of subsequent circuits and the system becomes unreliable. Additional difficulties arise with photo-electric readers where lubricated tapes, and most tapes employed in the communication field are lubricated, are to be read. Lubricated tapes are translucent rather than transparent and variations in light between perforated and unperforated areas are not great so that subtle techniques must be employed to discriminate between the available light variations. Further, the translucent tapes make the light source or sources appear as if they are located at the tape and the light from these apparent sources is diffused and produces cross-talk between circuits. Again, special techniques must be employed to overcome this difficulty.

It is an object of the present invention to provide a high speed perforated member sensing mechanism which is capable of operating at speeds comparable to the speeds of operation of photo-electric sensing mechanisms and which prevents the accumulation of dust and dirt around the sensing mechanism.

It is yet another object of the present invention to provide a high speed, perforated member sensing mechanism which is simple and inexpensive and which produces signals having an unusually high signal-to-noise ratio from a low impedance source.

It is yet another object of the present invention to provide a high speed perforated member sensing mechanism which produces A.C. or D.C. output signals.

Yet another object of the present invention is to provide a simple and inexpensive high speed perforated member sensing mechanism utilizing readily available components having standard and controllable characteristics and properties.

It is still another object of the present invention to provide a reliable yet uncomplicated high speed perforated sensing means capable of sensing perforations in optically transparent, translucent or opaque media.

It is still another object of the present invention to provide a high speed perforated member sensing mechanism having self-cleaning reading stations.

In accordance with the present invention, an electrical resistive element having a predetermined temperature-sensitive coefficient of resistance is disposed on one side of a perforated member reading station while an air pump is disposed on the opposite side of the reading station. The resistive element hereinafter referred to as a hot wire or anemometer element is connected in a closed circuit and is heated to a predetermined temperature by the current in the circuit. The perforated member to be sensed is passed between these two elements and where holes do not exist the air is substantially prevented from flowing over the impedance element and its temperature is unaffected by air flow. Upon the appearance of a perforation between the resistive element and the air pump, air is caused to flow over the impedance element and reduces its temperature thereby altering its impedance. A change in impedance of this element is therefore an indication of the presence of an aperture in the perforated member being sensed.

More specifically, a hot wire element is disposed in an aperture through a sensor plate forming an upper tape guide at a reading station of the mechanism. A blower is disposed on an opposite side of the reading station from the sensor plate and causes air to flow through the aperture in the sensor plate in which the hot wire element is disposed. When a solid section or the web of a perforated member is disposed between the intake manifold of the blower and the hot wire element, very little, if any, air is caused to flow through the aperture in the sensor plate and the temperature of the hot wire element is almost wholly dependent upon the current being supplied thereto. However, upon the interposition of a perforation between the element and the intake manifold of the blower, a flow of air is established across the element and its temperature is rapidly reduced. If the element has a positive temperature coefficient resistance, its resistance is reduced along with its temperature and this change of resistance is a ready indication of the presence of a perforation in the perforated member. By producing a signal indicative of this change in resistance, a reading apparatus is provided.

In a specific embodiment of the present invention, a sensor plate is provided with a plurality of apertures disposed transverse to the direction of movement of the perforated member. The number of apertures in the sensor plate is equal to the number of information perforations provided per character in each column of the member transverse to the direction of movement of the web. A manifold is provided below the sensor plate having an opening which is narrow in the direction of movement of the web and which extends transverse to the direction of movement of the web under all of the apertures in the sensor plate. A blower has its intake pipe attached to the manifold and the blower has a relatively large capacity compared with the volume of air permitted to enter the manifold through its opening, so that a pressure below atmospheric pressure may be maintained therein. Air is drawn into the manifold at all times but if a web portion of the perforated member is disposed between the opening in the manifold and any aperture in the sensor plate very little air flows through that particular aperture. However, if a perforation in the member to be sensed is disposed between a particular aperture and the intake opening in the aforesaid manifold, air flows through the aperture in the sensor plate and rapidly reduces the temperature of the hot wire element.

Hot wire elements normally have a relatively high thermal inertia and therefore a system which relies upon the change of temperature in the element produced wholly in response to initiation and termination of air flow through its associated aperture would be relatively slow compared to a photocell system, although it would be quite fast compared to conventional brush and pin readers. In order to increase the speed of response of the system, each hot wire element is connected in a circuit in which current flow is varied in such a way as to attempt to maintain the temperature of the element substantially constant. More specifically, upon a decrease in temperature of the element resulting from the flow of air thereacross, the voltage across the element changes and the change in voltage is sensed and applied to a feedback circuit which increases the current through the element. The increase in current through the element increases the electric heating thereof and therefore its temperature. The rise in temperature of the element increases its resistance and by employing a circuit with sufficient gain, the temperature of the element can be returned to very nearly that temperature which is achieved in the absence of air flow across the unit. Obviously, the precise temperature which is achieved in the absence of air flow cannot be attained during air flow since an error signal must be present to provide an input signal to the control circuit.

The response time of the circuit is primarily a function of the gain of the feedback circuit and by utilizing a circuit of relatively high gain, speeds of response may be obtained which permit the system to approach the speeds obtained by photo-electric reading systems. Further increases in the speed of operation of the apparatus is achieved by employing coiled rather than straight hot wire elements. In a straight wire element, it is found that the thermal inertia of the end supports for the wire materially effect the rate of response of the circuit. Where a coiled filament is employed, the major portion of the wire is sufficiently removed from the end supports to be substantially less affected by their thermal inertia than in the straight wire case.

Each of the wires is connected in a separate circuit so that the voltage across each may be independently sensed and the system may employ either A.C. or D.C. circuits. The disadvantage of a D.C. system is the tendency for the equipment to drift but either system may be employed under a given set of circumstances. Either continuous or discontinuous feed of the perforated member may be employed and if discontinuous feed is utilized then reading may occur while the web is stationary, or reading may occur during the interval of tape movement. In the former system the apparatus may constitute a static register in that output signals are available during the entire interval that the perforated member is stationary which may be as long as desired. On the other hand, the perforated member may be fed such that during the interval when it is stationary, the material between the columns of perforation is disposed adjacent the reading station in which case no information would be obtainable during this stationary interval. Upon movement of the perforated member from one stationary position to the next the perforations would pass over the reading station and an indication of the presence of a perforation would be obtained. The system may also accommodate continuous feed of the perforated member so long as the speed of movement of the member is not excessive. The apparatus, however, can easily accommodate reading speeds of a kilocycle per second; that is, each hot wire element and its associated circuitry can produce distinct indications of one thousand perforations each second.

The blower may blow or draw air through the apertures in the sensor plate. The latter system has a single important advantage over the former but in all other respects they are alike. In the system where air is drawn over the hot wire element and through the perforations in the tape, a vacuum cleaner effect is produced so that dirt and dust which might otherwise accumulate on the surfaces of the hot wire lying along the path of air flow is removed. Therefore, signal degradation resulting from dust accumulation is prevented and a serious difficulty encountered in photo-electric systems is eliminated. Further the hot wires may be selectively heated in order to burn off accumulations of dirt and dust which may not be removed by air flow.

The apparatus of the invention is extremely simple employing standard amplifier circuits and commercially available hot wires and air flowing equipment. Thus, extremely reliable and easily reproducible equipments can be fabricated.

In the embodiment of the invention thus far described the sensor plate and the air supply are located on opposite sides of the perforated member. In a second embodiment of the invention, the hot wire elements and the air supply are located on the same side of the tape. More specifically, the tape or card is drawn relatively tightly over a predetermined arcuate portion of the surface of a hollow drum. At substantially the center of the arcuate portion, the surface of the drum is apertured transverse to the tape and a hot wire is disposed in each aperture or adjacent thereto. Air is drawn into or forced out of the drum through the apertures in its surface which are aligned with apertures in the perforated member to be sensed. The apertures in the drum which are not aligned with perforations in the perforated member are blocked and air cannot flow therethrough. All characteristics of the apparatus conform to those of the first embodiment of the invention as to speed, reliability and the cleaning effect of the air flow.

It is another object of the present invention to provide an anemometer reading mechanism in which air is moved through perforations in a perforated member and over hot wire or anemometer elements disposed therein in order to reduce the temperature thereof and produce an output indication which is responsive to the variation in resistance of the element with temperature.

It is another object of the present invention to provide a hot wire perforation sensing mechanism in which air is drawn through perforations to be sensed, over hot wire elements and in which circuitry is employed to tend to maintain the resistance and therefore temperature of the elements constant at all times regardless of the condition of the air flow over the wire.

It is another object of the present invention to provide a hot wire or anemometer reading mechanism in which air is drawn over the anemometer and through perforations in the tape or web in order to prevent accumulation of dirt and dust on the surfaces of the anemometer over which air is to flow.

It is still another object of the present invention to provide a heated element, perforated tape or card reading mechanism in which a gaseous medium is caused to flow over the heated element when the element is aligned with a perforation to be sensed.

It is yet another object of the present invention to provide a heated element reading mechanism in which the heated element may have its temperature raised considerably above its normal operating temperature for short periods in order to burn off accumulated dirt and dust.

It is another object of the present invention to provide a hot wire reading mechanism in which the hot wire is coiled so as to reduce its thermal inertia resulting from its end supports.

It is still another object of the present invention to provide an anemometer perforated member reading mechanism employing an apertured drum having the anemometers disposed in each aperture and an air pump for flowing air through the apertures when a perforation in the member to be sensed is aligned therewith.

The above and still further objects, features and advantages of the present invention will become apparent upon consideration of the following detailed description of specific embodiments thereof, especially when taken in conjunction with the accompanying drawings, wherein:

FIGURE 1 of the accompanying drawings is a schematic cross sectional view in elevation of a first embodiment of the apparatus of the present invention;

FIGURE 2 is a schematic cross sectional diagram taken along line 2—2 of FIGURE 1;

Figure 3:
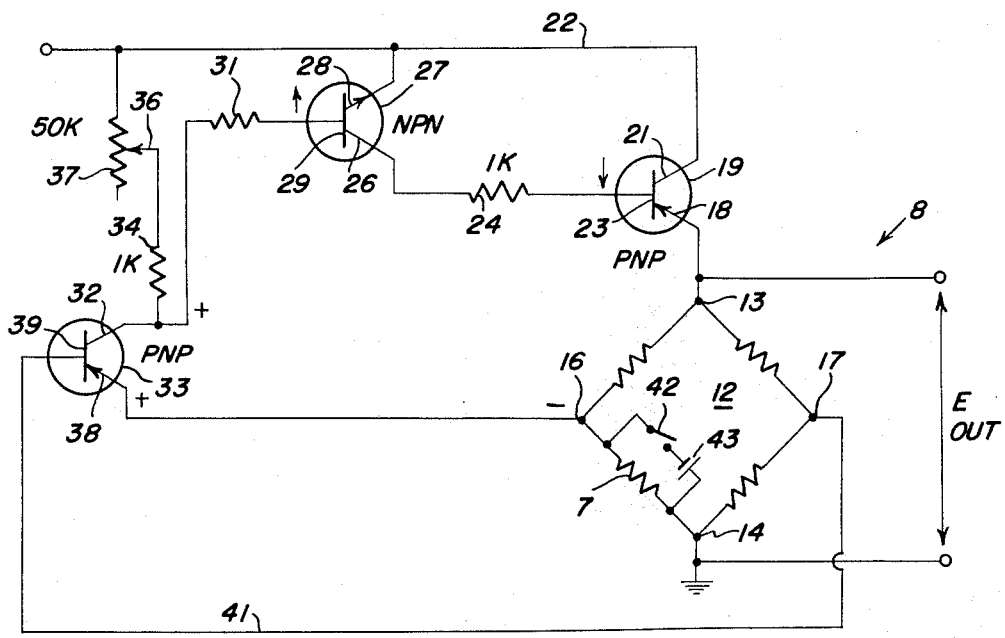
FIGURE 3 is a schematic wiring diagram of an embodiment of an electric circuit which may be employed to control the current to the hot wire measuring unit of the present invention.

Referring specifically to FIGURES 1 and 2 of the accompanying drawings, a sensor plate 1 is disposed above a perforated member 2 which is to be sensed by the apparatus of the present invention while a vacuum manifold 3 is disposed below the member 2 opposite the sensor plate 1. The member 2 is driven in a direction indicated by the arrow 4 by a drive sprocket 5 or other suitable transport mechanism. The sensor plate 1 is provided, in the illustrated embodiment of the invention, with a single column of vertically extending apertures 6 which is perpendicular to the direction of movement of the perforated member 2. The number of vertical apertures 6 in the sensor plate 1 depends entirely upon the number of apertures per code which is applied to the member 2. If the apparatus is being employed to sense punched paper tape, it may be provided with from 5 to 8 holes since paper tapes conventionally employ codes utilizing these number of holes.

A hot wire 7 is disposed in each of the apertures 6, the hot wire being a resistive element which is heated by the flow of current therethrough and which has a predetermined temperature coefficient of resistance. Each of the hot wires 7 is supplied with current from an amplifier 8 which is illustrated in detail in FIGURE 3 and described with respect to this figure. The vacuum manifold 3 which is disposed below the sensor plate 1 is provided with a slot 8 in its upper surface which extends across the bottom of all of the apertures 6 but is relatively narrow with respect to the direction of travel of the member 2. The bottom wall of the manifold 3 is provided with an aperture 9 to which is connected the intake side of an air blower 11. The blower 11 has a capacity that permits the pressure within the manifold 3 to be maintained below atmospheric pressure, as indicated by pressure gauge 10, so that a readily detectable flow of air is created through each of the apertures 6 in the sensor plate 1 in the absence of a web portion of the perforated member 2. As an example, a suitable pressure within the manifold 3 has been found to be of the order of magnitude of 0.2 inch of water although this figure is by no means intended to be limiting since this parameter is not critical.

In operation, in the absence of a perforation between an aperture 6 in a sensor plate 1 and the slot 8 in the manifold 3; that is, when a continuous portion of the member 2 is disposed in this region, very little air flows through the aperture 6 and in consequence the temperature of the hot wire 7 is a function substantially only of the current applied thereto by the amplifier 8. However, upon a perforation in the member 2 being disposed in this region, air is drawn downward through the aperture 6 and materially reduces the temperature of the hot wire 7. Since the wire 7 has a predetermined temperature coefficient of resistance, the variation in resistance of the wire 7 resulting from its change in temperature may be sensed as an indication of the fact that the member 2 is perforated in the region which is disposed adjacent the reading station. The apparatus for sensing this change in resistance and for controlling the current applied to the wire 7 as a result of this change is illustrated in FIGURE 3 of the accompanying drawings.

It can be seen from the above, that the air flow over the hot wire 7 materially reduces the amount of dust and paper chaff which can accumulate around the wire 7 and therefore reduces the difficulties encountered in many tape reading equipments as a result of build-up of such material. The substantial elimination of dust accumulation which results from the vacuum cleaner effect of the blower 11 insures a uniform response of the wire 7 over extended periods of operation and the output signal from the apparatus does not vary appreciably with time and environmental conditions.

In FIGURE 3 of the accompanying drawings there is illustrated a schematic wiring diagram of one embodiment of the amplifier 8 which measures the change in resistance of a hot wire 7 and varies the current to the wire so as to maintain its temperature substantially constant. If the hot wires 7 were simply supplied from a constant current source, the thermal inertia of the wires would materially reduce the speed of response of the system. However, in accordance with the invention the hot wire is maintained at a substantially constant temperature by employing a relatively high gain, closed loop system for varying current flow through the wires in such a sense as to maintain the wire resistance constant.

Referring now specifically to FIGURE 3, each hot wire 7 is connected as one arm of a different Wheatstone bridge 12 having input terminals 13 and 14 and conjugate-output terminals 16 and 17. For purposes of illustration only the terminal 14 is grounded. The terminal 13 is connected to an emitter electrode 18 of a PNP transistor 19 having a collector electrode 21 connected to a negative voltage bus 22 and a base electrode 23 connected through a resistor 24 to a collector electrode 26 of an NPN transistor 27. The transistor 27 is further provided with an emitter electrode 28 connected to the bus 22 and a base electrode 29 connected through a resistor 31 to a collector electrode 32 of a PNP transistor 33. The collector electrode 32 of the transistor 33 is further connected through a resistor 34 to a variable tap 36 adapted to engage a resistor 37, one end of the resistor 37 being connected to the negative bus 22. The transistor 33 is further provided with an emitter electrode 38 connected to the output terminal 16 of the bridge 12 and a base electrode 39 connected via a lead 41 to the other output terminal 17 of the bridge 12. The output terminals of the circuit are taken as being connected to ground and to the terminal 13 of the bridge.

The circuit illustrated is a positive feedback circuit and the resistor 37 and tap 36 are employed to adjust the bias on the base 29 of the transistor 27 in order to obtain maximum gain of the circuit, short of oscillation. Under normal conditions the bridge 12 is balanced and the voltages at the output terminals 16 and 17 of the bridge 12 are equal. The system is adjusted so that under these conditions a current flows through the hot wire 7 which is just sufficient to maintain the resistance of the wire 7 at a value such that the bridge remains balanced. Upon a perforation being disposed opposite the hot wire 7 the temperature of the wire is reduced such that the resistance of the hot wire 7 is reduced. The bridge becomes unbalanced, and the voltage at the terminal 16 becomes positive with respect to the voltage at the terminal 17. Conduction through the PNP transistor 33 is increased and the voltage of the collector electrode 32 of transistor 33 rises towards ground potential. The rise in potential of the collector 32 is applied to the base electrode 29 of the transistor 27. Since the emitter electrode 28 of the transistor 27 is connected to the negative bus 22, a rise in potential of the base electrode 29 towards ground potential increases conduction through the transistor 27 and effects a decrease in the voltage with respect to ground of the base electrode 23 of the transistor 19. Since the emitter electrode 18 of the transistor 19 is returned to ground through the bridge 12, the decrease with respect to ground of the voltage at the base electrode 23 increases current through the transistor 19 and therefore through the bridge 12. The increase in current through the transistor 19 and therefore through the bridge 12 has two effects: First, it raises the voltage across the bridge 12 and this rise in voltage may be sensed as an indication of a perforation being sensed by the apparatus and; second, the increased current through the bridge 12 tends to increase electrical heating of the hot wire 7. By appropriately designing the closed loop circuit of the apparatus, the gain of the system may be made such that the increase in current through the bridge 12 rapidly raises the temperature of the hot wire 7 to a value very close to its temperature in the absence of air flow. In consequence, when the perforation is withdrawn from the sensing station the hot wire is substantially at the correct temperature for performing the next measurement and the speed of response of the system is quite rapid, depending only upon the time required for the closed loop to respond to and correct the initial temperature change of the hot wire. This interval is a function of the gain of the closed loop circuit and by making this gain sufficiently great reading rates of a thousand cycles per second and greater can be achieved.

The circuit illustrated in FIGURE 3 is a D.C. circuit utilizing a D.C. bridge and a D.C. feedback amplifier. It is to be understood that if an alternating current were applied to the bridge terminal 13, a feedback amplifier system operating on A.C. signals could easily be provided to maintain element 7 at essentially constant temperature. Thus, although the described circuit operates on D.C. signals, an equivalent A.C. control loop could be provided, in accordance with completely conventional and well-known techniques.

The apparatus of the invention may be utilized in three distinct ways, one involving the use of a continuously moving member 2 and the other two involving use of a discontinuously moving member. In any of these cases, an A.C. bridge circuit may be preferred since it has an advantage over a D.C. circuit in that drift is not encountered. Where discontinuous transport of the member 2 is utilized, it may be positioned, during its stationary intervals, with the perforations aligned with the sensing station or displaced from the sensing station. In the former case, the apparatus may be utilized as a storage register.

The circuit illustrated in FIGURE 3 is purely exemplary and the specific circuitry may take many forms in which a Wheatstone bridge may or may not be employed and in which transistors may or may not be employed. Obviously, transistors may be replaced by electron tubes, magnetic amplifiers or other suitable amplifying devices. Further, many transistor circuits other than the one illustrated may be employed to obtain the necessary closed loop control.

As indicated above, in systems where reduction of accumulation of lint and dust from the tape around the elements 7 is of little interest, the manifold may provide compressed air to blow air over the anemometer elements instead of drawing air over them. The system need not rely wholly upon air flow to remove dirt and dust accumulated around the hot wire elements. This residue may be removed by raising the heat of the element 6 to a sufficient temperature to burn the residue and in FIGURE 3 there is illustrated a series connected switch 42 and battery 43 connected across the element 7 for this purpose. Other methods of raising the temperature of the element 7 may be employed such as shorting the upper left resistor of the bridge or shunting the transistor 19 or both or employing a power transistor for transistor 19 and producing full conduction therethrough with or without shorting the aforesaid resistor. The apparatus has been described as employing a hot wire element but it is to be understood that other temperature sensitive resistors may be employed. The hot wire element is preferable because its large surface area to volume ratio permits rapid variations in temperature with changes in ambient conditions. Further, where hot wires are employed it has been found preferable to employ a coiled rather than straight wire. In a straight wire the end supports operate as heat sinks and increase the thermal inertia of the apparatus. With a coiled wire the end supports are sufficiently removed from the major portion of the hot wire so as not to appreciably affect the temperature characteristics. This is an important feature of the invention since the unusually rapid response of system is dependent to an extent upon this feature.

Figure 4:
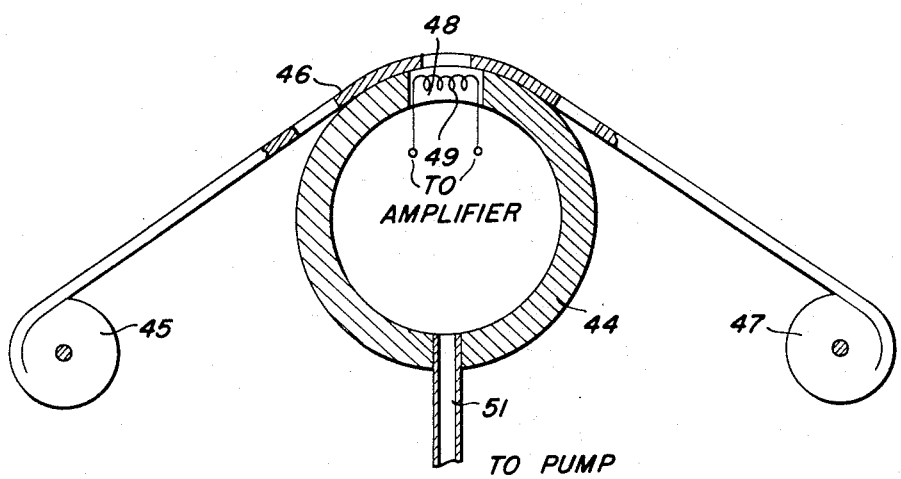
FIGURE 4 is a schematic cross sectional view of a second embodiment of the invention.

The system of the invention may be employed to read any type of perforated member such as cards, tapes, etc. The system has been described as requiring the source of air and the hot wires to be disposed on opposite sides of the perforated members and in many installations this is the preferred method of operation. However, in some types of tape reading systems the tape is wrapped relatively tightly around a portion of a drum and in such systems the wire and air source may be disposed within the drum since the tape seals the apertures in which the wires are disposed except in those locations where perforations in the tape are in alignment with the apertures. Such a system is illustrated in FIGURE 4 of the accompanying drawings. Referring specifically to FIGURE 4 a stationary hollow drum 44 has a tape 46 drawn lightly around an arcuate portion of the surface of the drum. The tape may be supplied from reel 45 to a reel 47 both of which may be power driven and may alternate as take-up and supplied reels. The drum has a plurality of apertures 49, only one of which is illustrated, through the surface of the drum in the approximate center of the region of control of the tape. The apertures 49 are arranged in a row transverse to direction of movement of the tape and are at least equal to the number of possible perforations per row of the tape 46. A hot wire anemometer element 48 is disposed in each aperture 49, or adjacent thereto and is connected in a control circuit such as the one illustrated in FIGURE 3 of the accompanying drawings. The interior of the drum 44 is connected via a pipe 51 to a suitable air pump or blower which establishes a predetermined pressure in the drum; the drum operating as a manifold in the air flow system.

When a perforation in the tape 46 is aligned with an aperture 49 in the drum 44 air flows through the aperture and over the filament 48. Such an occurrence is sensed by the circuitry as an indication of a perforation. If, however, a web portion of the tape 46 is disposed over the aperture 49, air is prevented from flowing through the aperture particularly since the tape is drawn relatively taut and forms a relatively effective air seal with the surface of the drum. The seal can be enhanced by employing a suction system although this is not essential and in some embodiments it is preferable to employ a pressure type system for blowing air out of the drum. Such a system may be employed in areas where explosive atmospheres are encountered and it is necessary to prevent them from contacting the hot wires. If filtered air or a non-explosive gas is passed through the system and is forced out of the drum 44 through apertures 49 then the explosive gases cannot come in contact with the hot wire.

In all other respects the second embodiment of the invention conforms to that of the first and has all of the advantages thereof. Any suitable record transport mechanism may be employed to move a perforated member; that is, card or tape, and maintain it against the manifold drum 44 so that air leakage is minimized. The system may operate at the same speeds as the first embodiment and has the additional advantage of extreme simplicity. The apparatus is illustrated as employing a circular drum but obviously other shapes may be employed. Preferably, all such members should provide an arcuate surface for contact with the tape so that the tape may be maintained taut without fear of tearing on sharp edges.

While I have described and illustrated several specific embodiments of my invention, it will be clear that variations of the details of construction which are specifically illustrated and described may be resorted to without departing from the true spirit and scope of the invention as defined in the appended claims.

What I claim is:

1. A mechanism for sensing perforations in perforated members comprising at least one heated element having a variable electrical resistance versus temperature characteristic, means for producing a flow of air over said heated element, feed means for moving a perforated member between said element and said means along a path such that perforations in the member become disposed between said element and said means for producing, and measuring means for determining an impedance characteristic of said element.

2. A mechanism for sensing perforations in a perforated member, comprising at least one electrically heated element having a variable electrical resistance versus temperature characteristic, means for producing a flow of air over said heated element, feeding means for moving a perforated member between said element and said means along a path such that perforations in the member become disposed between said element and said means for producing, and measuring means for determining an impedance characteristic of said element.

3. A mechanism for sensing perforations in a perforated member comprising at least one heated element having a variable electrical resistance versus temperature characteristic, suction means for flowing a gas over said element, feeding means for moving a perforated member between said element and said suction means to interrupt the flow of gas over said element, said member being moved along a path such that perforations in the member become disposed between said element and said suction means and measuring means for determining an impedance characteristic of said element.

4. A mechanism for sensing perforations in a perforated member comprising at least one electrically heatable element having a variable impedance versus temperature characteristic, a circuit for passing current through said element, suction means for flowing air over said element, feeding means for moving a perforated member between said element and said suction means to interrupt the flow of air over said element, said member being moved along a path such that perforations in said member become disposed between said element and said suction means, and means for detecting a change in resistance of said element.

5. A mechanism for sensing perforations in a perforated member comprising at least one electrically heatable element having a variable impedance versus temperature characteristic, a circuit for passing current through said element, suction means for flowing air over said element, feeding means for moving a perforated member between said element and said suction means to interrupt the flow of air over said element, said member being moved along a path such that perforations in said member become disposed between said element and said suction means and means responsive to a change in resistance of said element for varying the current through said element to resist changes of resistance thereof.

6. A mechanism for sensing perforations in a perforated member comprising a resistance bridge having a plurality of impedance arms, a temperature variable impedance comprising one of said arms, means adapted to apply a voltage to said bridge, means responsive to a change in output voltage from said bridge for varying its input voltage in such a sense as to reduce the variation in said output voltage, means for directing a flow of gas over said variable impedance and means for feeding a perforated member along a path between said means for directing and said variable impedance such that perforations therein pass between said temperature variable impedance and said means for directing.

7. A mechanism for sensing perforations in a perforated member comprising a normally balanced resistance bridge having four impedance arms, a temperature variable impedance connected in one of said arms, means adapted to apply a voltage across said bridge, means responsive to an output voltage from said bridge for varying the input voltage in such a sense to reduce said output voltage, suction means for producing a flow of gas over said variable impedance, feeding means for moving a perforated member between said variable impedance and said suction means to interrupt the flow of gas over said variable impedance, said member being moved along a path such that perforations in the member become disposed between said temperature variable impedance and said suction means.

8. A mechanism for sensing perforations in perforated members comprising at least one temperature sensitive impedance element, means for flowing air over said element, feed means for moving a perforated member between said element and said means for flowing along a path such that perforations in the member become disposed between said element and said means for flowing, and measuring means for determining an impedance characteristic of said element.

9. A mechanism for sensing perforations in perforated members comprising at least one reading station, at least one heated element having a temperature variable electric resistance disposed at said reading station, means for producing a flow of air over said element, feed means for moving a perforated member relative to said element such that alternate web portions and perforated portions of the member are presented to said reading station, means for preventing flow of air over said element upon presentation of a web portion of the member to said reading station and means for measuring an impedance characteristic of said element.

10. A mechanism for sensing perforations in perforated members comprising a reading station having a perforated surface element, at least one heatable temperature sensitive impedance element, means for flowing air through a perforation in said surface element, means for causing air passing through said perforation in said surface element to pass over said impedance element, feed means for moving said perforated member such that alternate web portions and perforated portions are brought into alignment with said perforations in said surface element, means for materially reducing air flow through said perforation in said surface element upon a web portion of said perforated member becoming aligned therewith and means for measuring an impedance characteristic of said heated impedance element.

11. A mechanism for sensing perforations in perforated members comprising a reading station having a perforated surface element, at least one heatable coil of fine wire having a temperature variable impedance characteristic, means for flowing air through a perforation in said surface element, means for causing air passing through said perforation in said surface element to pass over said coil of fine wire, feed means for moving said perforated member such that alternate web portions and perforated portions are brought into alignment with said perforations in said surface element, means for materially reducing air flow through said perforation in said surface element upon a web portion of said perforated member becoming aligned therewith and means for measuring an impedance characteristic of said coil of fine wire.

12. A mechanism for sensing perforations in perforated members comprising a reading station having a perforated surface element, at least one heatable temperature sensitive impedance element, means for flowing air through a perforation in said surface element, means for causing air passing through said perforation in said surface element to pass over said impedance element, feed means for moving said perforated member such that alterate web portions and perforated portions are brought into alignment with said perforations in said surface element, means for materially reducing air flow through said perforation in said surface element upon a web portion of said perforated member becoming aligned therewith, means for measuring an impedance characteristic of said heated element, and means for selectively increasing the temperature of said impedance element to at least that required to burn or char dust, and small pieces of paper.

13. A perforated member sensing mechanism comprising a hollow member having at least one wall, at least one perforation in said wall, means for developing a flow of air through said aperture, a heatable impedance element temperature-variable resistance characteristic disposed in the path of flow of air through said aperture, means for moving a perforated member over said wall such that alternate web portions and perforated portions thereof are aligned with said aperture in said wall and means for measuring changes in impedance of said impedance element.

14. A perforated member sensing mechanism comprising a hollow member having an arcuate wall, a feeding means for a perforated member, said feeding means being capable of maintaining said perforated member tightly against said wall, a plurality of apertures in said wall aligned transverse to the direction of movement of the perforated member, a temperature sensitive impedance element disposed in each of said apertures, means for producing a flow of air through said apertures, said feed means moving a perforated member along a path such that alternate web and perforated portions of the member are presented to said apertures in said wall, and means for sensing changes of impedance of said impedance elements.

15. The combination in accordance with claim 14 wherein each of said impedance elements comprises a coil of fine wire.

16. The combination in accordance with claim 14 further comprising means for supplying an electric current to each of said impedance elements and means responsive to changes in impedance of said impedance elements to vary the current therethrough in such a sense as to reduce impedance changes thereof.

17. A mechanism for sensing perforations in perforated members comprising a reading station having a first wall with at least one aperture, a second wall with at least one aperture generally opposed to said aperture in said first wall, means for flowing air through said apertures, feeding means for moving a perforated member between said walls along a path such that web portions and perforated portions thereof pass between said apertures in said walls and thermal responsive means for sensing variations in air flow through one of said apertures.

18. A mechanism for sensing perforations in perforated members comprising a reading station having a first wall with at least one aperture, a second wall with at least one aperture generally opposed to said aperture in said first wall, an air pump disposed adjacent said first wall, means for causing said pump to draw air through said apertures, feeding means for moving a perforated member between said walls along a path such that web portions and perforated portions thereof pass between said apertures in said walls and thermo-electric means for sensing variations in air flow through one of said apertures.

19. A mechanism for sensing perforations in a perforated member comprising a sensing station at least one element having an electrical characteristic variable with temperature disposed at said sensing station, means for establishing a flow of fluid relative to said element at said sensing station, means for passing a perforated member along a path such that the quantity of fluid flowing over said element varies with the presentation of perforated and unperforated areas of said perforated member to said sensing station, and means for sensing changes in the electrical characteristic of said element.

20. The combination according to claim 19 further comprising a plurality of elements arranged at said sensing station, said means for establishing a flow of fluid establishing said flow relative to all of said elements and means for sensing changes in resistances of each of said elements.

References Cited in the file of this patent
UNITED STATES PATENTS

| | | |
|---|---|---|
| 2,510,552 | Carroll et al. | June 6, 1950 |
| 2,563,290 | Thomas et al. | Aug. 7, 1951 |